No. 835,679. PATENTED NOV. 13, 1906.
C. HANSEN.
FIREARM.
APPLICATION FILED MAY 18, 1906.
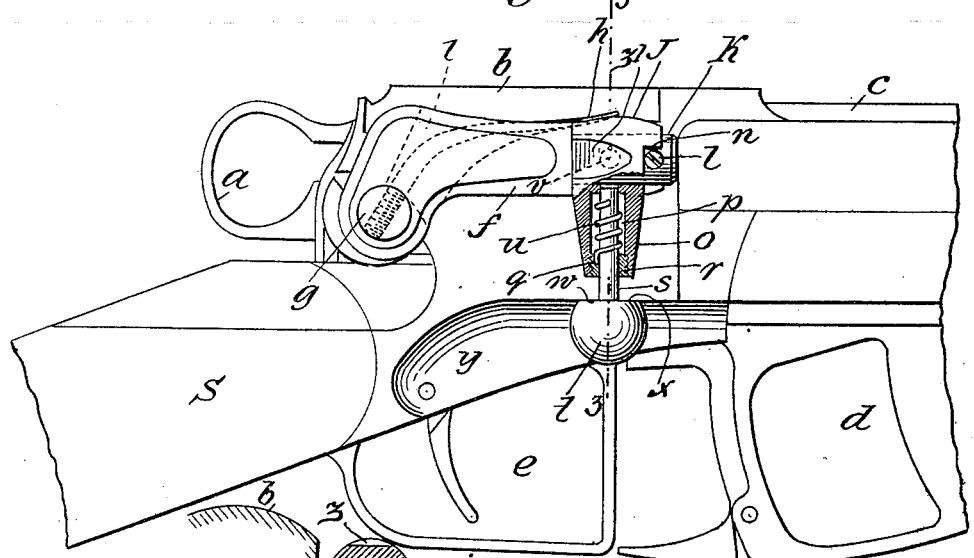
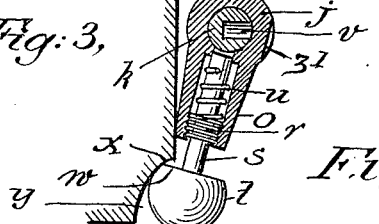
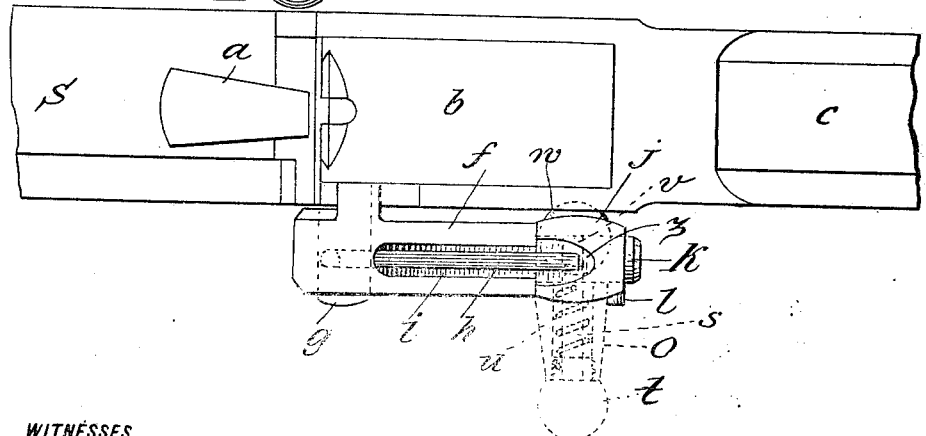
WITNESSES
Ernest N. Wager
F. A. Stewart
INVENTOR
Carl Hansen
Edgar Tate & Co.
ATTORNEYS

UNITED STATES PATENT OFFICE.

CARL HANSEN, OF JOHNSON, NEW YORK.

FIREARM.

No. 835,679.　　　　Specification of Letters Patent.　　　　Patented Nov. 13, 1906.

Application filed May 18, 1906. Serial No. 317,549.

*To all whom it may concern:*

Be it known that I, CARL HANSEN, a subject of the King of Denmark, residing at Johnson, in the county of Orange and State of New York, have invented certain new and useful Improvements in Firearms, of which the following is a specification, such as will enable those skilled in the art to which it appertains to make and use the same.

My invention relates to firearms, and refers particularly to the construction of the handle used in breech-loading magazine-guns, and is specifically an improvement of the class of handles as described and illustrated in my application for Letters Patent on magazine-guns, filed April 25, 1906, Serial No. 313,567.

The purpose of my improvement is to provide the handle with a locking device which will enable the users of such improved firearms to guard with entire surety against any possible accidental discharge of the gun, a further object being to provide a gun which when the handle is locked will present in all its outlines a compact form with none of its parts projecting from the surfaces of the same, which projecting parts might otherwise be caught by passing objects, such as branches of trees, or by accidental brushing against a fixed outwardly-extending handle, and thereby discharge the gun, and I accomplish these and other objects by the employment of a handle which is rotatable upon its axis and which is held and locked by means of springs, movable pins, and knobs to the casing of the breech-bolt.

The invention is fully disclosed in the following specification, of which the accompanying drawings form a part, in which the separate parts of my improvement are designated by suitable reference characters in each of the views, and in which—

Figure 1 is a side view of a part of a magazine-gun with my improved handle attachment; Fig. 2, a top view of the same, and Fig. 3 a partial section on the line 3 3 of Fig. 1.

In the drawings, S is the stock, $a$ is the firing-pin loop, $b$ is the bolt-lock, $c$ is the receiver, $d$ is the magazine, $e$ is the trigger and trigger-guard, and $f$ is the main part of the handle, all of these parts being the same as in the application hereinbefore referred to.

The handle is pivoted at $g$ and can operate to lock and unlock the bolt-lock $b$ in the manner described in my above-referred-to former application. A strong spring $h$ is screwed to the pivot-pin $g$ and is located within the rearward part of the handle $f$. Said part of the handle is provided with a vertical slot $i$, through which the spring $h$ passes, and the latter is of such construction and tension that its action causes a forced forward and downward direction of the handle by means of the outer terminal of said spring $h$ resting upon the forwardly-placed rotative part $j$ of the handle $f$. The forward part $f$ has an outer extension $k$, which is in the nature of a shaft upon which rotates the forward part $j$ of the handle. This part $j$ is composed of a sleeve which slips over the shaft $k$ and is held thereon by means of the set-screw $l$, which enters the shaft $k$ and which also limits the rotative travel of the sleeve $j$ by means of the shoulder $n$, cut thereon. The sleeve $j$ has an outwardly-cone-shaped projection $o$, which has a central bore $p$ and is internally threaded at $q$ for the reception of a threaded collar $r$, also having a central bore through which the pin $s$, having an outer knob $t$, passes.

Encircling the shank of the pin $s$ is a tension coil-spring $u$, one terminal of which is fastened to a perforation in the collar $r$, while the other terminal of the spring $u$ enters into a perforation near the inner end of the pin $s$. The tendency of this spring $u$, fastened in this manner both to the collar $r$ and the pin $s$, is to pull the latter inwardly into the central bore of the cone $o$, and thereby causes the inner terminal of the pin $s$ to enter a drill-hole $v$, (shown in dotted lines in Fig. 1,) and located in the shaft extension $k$ of the main handle member $f$ whenever the rotatable parts $j$ and $o$ of the handle are thrown upwardly into the position shown in dotted lines in Fig. 2 of the drawings, and thereby securely lock together the rearward part $f$ and the forward rotatable part $j$ of the handle.

Whenever the handle is locked, as shown in Fig. 1, the pin $s$ is withdrawn from the drill-hole $v$ and the rim $w$ of the flattened part of the knob $t$ catches under and rests against the upper edge $x$ of the concave $y$, situated beneath the bolt-lock $b$ and above the trigger-guard $e$ of the gun. The sleeve $j$ is flattened on its outer surface in two parts $z$ and $z'$, upon which the outer end of the main handle-spring $h$ bears either when the same is locked or unlocked, and thereby tends to hold the knob $t$ more securely in its contact position with the edge of the concave $y$ whenever the rotative part of the handle has been secured in this position.

It is apparent that by means of my improved handle-locking device the outward-projecting cone $o$, with knob $t$, usually extending at right angles to the side of the gun, is changed into a position parallel with the side of the same whenever the entire gun mechanism is locked, that accidental discharges of the gun can be effectually operated thereby, that the same is more compact in form, that when the knob $t$ is released and swung upwardly into the operating position the latter and the cone $o$ are securely fastened to the operating part $f$ of the handle, thereby making it serviceable for all the intents and purposes desired in firearms of this kind.

Having fully described my invention, what I claim as new, and desire to secure by Letters Patent, is—

1. In a firearm, a pivoted handle designed to manipulate the mechanism for locking and unlocking the receiver of the gun, said handle being composed of a main member placed outwardly and longitudinally to the side of the receiver and having a knob-carrying projection rotatably mounted upon the main handle member in such a manner that the same can be swung radially from a horizontal to a vertical position and vice versa.

2. In a firearm, a pivoted handle provided with a rotatably-mounted knob-carrying projection adapted to swing transversely of the barrel and which extends at right angles to the main part of the handle and is designed to describe a quarter of an arc and to assume a downwardly-directed vertical position or a laterally-directed position, and means for locking said knob-carrying projection in either position.

3. In a firearm a composite handle one part of which is pivoted to the bolt-lock mechanism and which ranges longitudinally and parallel with the side of the gun and having a shaft extension on its outer free end and an adjustable movable part of the handle which is adapted to rotate over the outer shaft extension of the handle and at right angles to the side of the gun, means for locking the rotatable part of the handle comprising a spring-actuated locking-pin when extending at right angles to the side of the gun, means for unlocking the same from this position by withdrawing the locking-pin, and means for locking the movable part of the handle when depressed to a vertical position.

4. A pivoted composite handle for firearms, one part of the same ranging longitudinally and parallel to the side of the gun and provided with an internally-located spring securely fastened to the pivot-pin of the handle and bearing upon a movable part of the handle which can be adjusted in position either to extend at right angles to the side of the gun or placed vertically parallel therewith, whereby the handle-spring is adapted to keep the handle in a forced forwardly-directed downward position.

In testimony that I claim the foregoing as my invention I have signed my name, in presence of the subscribing witnesses, this 16th day of May, 1906.

CARL HANSEN.

Witnesses:
  F. A. STEWART,
  C. E. MULREANY.